United States Patent
Heine et al.

(10) Patent No.: US 9,738,249 B2
(45) Date of Patent: Aug. 22, 2017

(54) SELF-LOCKING BELT RETRACTOR ANTI-RATTLE ACTION ON ITS BELT-STRAP-SENSITIVE CONTROL SYSTEM THAT IS EFFECTIVE IN THE WINDING DIRECTION OF THE BELT SHAFT

(71) Applicant: Autoliv Develpement AB, Vargarda (SE)

(72) Inventors: Volkmar Heine, Hamburg (DE); Uwe Bosse, Hamburg (DE); Melanie Weiss, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 131 days.

(21) Appl. No.: 14/369,506

(22) PCT Filed: Dec. 18, 2012

(86) PCT No.: PCT/EP2012/075898

§ 371 (c)(1),
(2) Date: Jun. 27, 2014

(87) PCT Pub. No.: WO2013/098118

PCT Pub. Date: Jul. 4, 2013

(65) Prior Publication Data

US 2014/0353416 A1    Dec. 4, 2014

(30) Foreign Application Priority Data

Dec. 27, 2011 (DE) ............... 10 2011 057 066

(51) Int. Cl.
B60R 22/38 (2006.01)

(52) U.S. Cl.
CPC .................. B60R 22/38 (2013.01)

(58) Field of Classification Search
CPC ........................................... B60R 22/38
(Continued)

(56) References Cited

U.S. PATENT DOCUMENTS 3,851,835 A * 12/1974 Fohl ............... B60R 22/38
242/383.3
3,883,089 A * 5/1975 Close ............. B60R 22/41
242/383.1

(Continued)

FOREIGN PATENT DOCUMENTS

DE    2 020 315    4/1970
DE    29 24 575    2/1981

(Continued)

OTHER PUBLICATIONS

PCT International Search Report—Aug. 21, 2013.
German Examination Report—Dec. 3, 2012.

*Primary Examiner* — Sang Kim
(74) *Attorney, Agent, or Firm* — Brinks Gilson & Lione

(57) ABSTRACT

A self-locking belt retractor for seat belts having a belt-strap-sensitive control mechanism with a control disc coupled to the belt shaft to control a locking element, by means of a pin moveably in an oblong hole in the control disc. The control disc carries an inertia element that, when triggered, radially swivels to lock the retractor belt shaft engages into a stationary toothed section. A control clip has two spaced apart legs on a friction mount between a blocking position of the inertia element and a release position. A follower forms stop surfaces engageable with the clip legs to carry the control clip during the rotation of the control disc belt winding direction a belt extension direction. The control clip releases the inertia element in the release position. One spring leg extends with an end into the movement path of the pin in the oblong hole.

12 Claims, 7 Drawing Sheets

(58) Field of Classification Search
USPC .................................................. 242/382.1
See application file for complete search history.

(56) References Cited

U.S. PATENT DOCUMENTS

| | | | | | |
|---|---|---|---|---|---|
| 4,461,434 | A * | 7/1984 | Butenop | ................ | B60R 22/38 |
| | | | | | 242/383.2 |
| 5,388,780 | A * | 2/1995 | Matsuki | ................ | B60R 22/41 |
| | | | | | 242/383.1 |
| 7,055,774 | B2 * | 6/2006 | Strobel | ................ | B60R 22/405 |
| | | | | | 242/382.1 |
| 7,635,103 | B2 * | 12/2009 | Kim | ................ | B60R 22/41 |
| | | | | | 242/379.1 |
| 7,681,824 | B2 * | 3/2010 | Mori | ................ | B60R 22/405 |
| | | | | | 242/382.1 |
| 7,770,836 | B2 * | 8/2010 | Bok | ................ | B60R 22/41 |
| | | | | | 242/383 |
| 8,118,249 | B2 * | 2/2012 | Aihara | ................ | B60R 22/41 |
| | | | | | 242/383.1 |
| 2005/0224623 | A1 * | 10/2005 | Sumiyashiki | ........... | B60R 22/41 |
| | | | | | 242/384.2 |
| 2007/0290091 | A1 | 12/2007 | Mori | | |
| 2009/0218432 | A1 * | 9/2009 | Aihara | ................ | B60R 22/41 |
| | | | | | 242/396.2 |
| 2011/0127363 | A1 * | 6/2011 | Tatsuma | ................ | B60R 22/405 |
| | | | | | 242/383.2 |
| 2014/0042256 | A1 * | 2/2014 | Yamada | ................ | B60R 22/38 |
| | | | | | 242/382.1 |

FOREIGN PATENT DOCUMENTS

| | | |
|---|---|---|
| DE | 39 26 370 A1 | 2/1990 |
| DE | 103 24 195 A1 | 1/2005 |
| DE | 10 2008 053 853 A1 | 7/2009 |
| EP | 1 860 002 A1 | 11/2007 |
| EP | WO 2009/049754 A1 | 4/2009 |
| GB | 2 099 287 A | 12/1982 |
| GB | 2 269 308 A | 2/1994 |
| GB | 2 294 384 A | 5/1996 |

* cited by examiner

SELF-LOCKING BELT RETRACTOR ANTI-RATTLE ACTION ON ITS BELT-STRAP-SENSITIVE CONTROL SYSTEM THAT IS EFFECTIVE IN THE WINDING DIRECTION OF THE BELT SHAFT

CROSS REFERENCE TO RELATED APPLICATIONS

This application claims priority to German Patent Application No. 10 2011 057 066.7, filed Dec. 27, 2011 and PCT/EP2012/075898, filed Dec. 18, 2012.

FIELD OF THE INVENTION

The invention relates to a self-locking belt retractor for seat belts having a belt shaft mounted rotatably in a housing frame and tensioned by a winding spring in the winding direction of the seat belt and having at least one belt-strap-sensitive control mechanism which has a control disc coupled to the belt shaft to control a locking element arranged on the belt shaft that can be deflected during a relative rotation between the belt shaft and the control disc until engaging in a housing gear against spring action. The locking element is coupled to the control disc by means of a pin that engages in an oblong hole in the control disc, the pin being guided in the oblong hole between the control disc and the belt shaft and rotating therein during the relative rotation, wherein the control disc carries a two-armed inertia element eccentrically swivel-mounted on the control disc that, when triggered, swivels radially against the action of the return spring with its one blocking arm until it engages into a stationary toothed section owing to the angular acceleration acting on the control disc. As a result of this interaction, the control disc stops its rotational movement and is fixed, and wherein a control clip having two legs that are spaced apart from each other in the peripheral direction is mounted in a mounting point for the belt shaft and/or the control disk by means of a friction mount relative to the control disc between a contact position on the inertia element and a contact position on a rotatable follower protruding from the plane of the control disc.

A belt retractor having the characteristics mentioned above is described with respect to its applicable features in EP 1 860 002 A1 including the deflection of its pin, which is arranged on the locking element and guided in an oblong hole configured in the control disc, by blocking the belt retractor by means of a relative rotation between the control disc and the locking element. The corresponding function of such a belt retractor configured in this way is also described in detail in DE 103 24 195 B4 with reference to DE 29 24 575 A1 or DE 39 26 370 A1.

In such a belt retractor provided with a belt-strap-sensitive control mechanism the problem can arise, for example, that after the occupant taking off the seat belt, the winding spring of the belt shaft can rotate in the winding direction at such a rotational speed that, owing to the stop of the rotational movement acting on the end of the belt-strap retractor, the belt shaft is sprung back in the unwinding direction due to inertia and, because of the resultant rotation of the belt shaft in the belt release direction even with a slight rotational acceleration, the belt-strap-sensitive control mechanism is activated, i.e. the inertia element is deflected to its engagement with a stationary toothed section. The same can occur when the belt-strap retractor is interrupted by a sudden braking of the vehicle. This behavior of the belt retractor can result in that the belt retractor must be unlocked for a further use by pulling from the belt-strap in order to unlock the control system and finally be able to freely pull out the belt. Another problem occurs when the webbing-sensitive control system response to small vibrations when the seatbelt is unlatched, giving rise to undesirable rattle noise generation.

To overcome this problem, the arrangement of a torsion spring or control clip on a mounting point for the belt shaft and/or the control disc via frictional locking, and thus relative to the control disc, is proposed for the belt retractor described in the category-defining EP 1 860 002 A1, the torsion spring having a Ω-shape with a central mounting area provided with a radius and spring legs protruding laterally on opposite sides therefrom and spring legs extending toward each other at an angle of 180°. One leg thereby interacts with one end of the inertial mass, while the other leg is in contact with a follower protruding from the plane of the control disc. The frictional torsion of the torsion spring on its mounting point accompanying the different functional sequences of the belt retractor is caused, on the one hand, by the torsion spring's own moment of inertia acting on it and, on the other hand, by the interaction with the inertia-controlled movement of the inertia element. This can disadvantageously result in control problems during the interaction of the torsion spring with the inertia element.

Another problem is that, on the one hand, the movement of the inertia element on the control disc and the pin of the locking element in the oblong hole of the control disc, on the other hand, can result in corresponding rattle noises which are undesirable.

It is therefore the underlying object of the invention to further develop a self-locking belt retractor of the generic type such that its functioning is improved with a simultaneous substantial noise reduction.

This object is attained by advantageous embodiments and further developments as described in this description.

SUMMARY AND INTRODUCTORY DESCRIPTION OF THE INVENTION

The basic idea of the invention is that both legs of the control clip arranged in a plane above the inertia element and spaced apart from the plane of the control disc encompass the follower between them and overlap with stops reaching into the plane of the control disc, wherein the follower forms stop surfaces for the clip legs to carry the control clip during the rotation of the control disc both in the belt winding and release directions such that the control clip releases the control disc during rotation of the control disc in the belt release direction and prevents the inertia element from swiveling during rotation of the control disc in the belt winding direction, and furthermore that the spring leg used to carry the control clip in the belt winding direction extends with its stop into the movement path of the pin in the oblong hole during the rotation of the control disc in the belt winding direction and as a result fixes the locking element on the belt shaft.

On the one hand, the invention is based on the basic principle of preventing the inertia element from swiveling independently of the moment of inertia acting on it by means of the provided control clip. Since, in particular, a response of the inertia element with its swiveling must be possible in an unhindered manner when the belt is extended, it should be ensured that, owing to the special shape and arrangement of the control clip in connection with the follower, when the belt extension is started, the control disc rotating together with the belt shaft is twisted at a certain angle relative to the control clip that remains stationary because of its frictionally locked mounting until the leg provided to fix the inertia element lies outside the swivel path of the inertia element, so that the inertia element can freely swivel with the corresponding rotational movements of the control disc. In this release position of the control clip, the clip leg gets into contact with the associated stop surface of the follower and is taken along in this position upon the further rotation of the control disc, so that the control clip maintains the release position assumed on the control disc. During the subsequent rotation of the belt shaft with the control disc in the belt winding (retraction) direction, there is again a relative rotation of the control disc with respect to the still stationary control clip because of its frictionally locked mounting, so that, upon rotation of the control disc, the inertia element pushes out its swivel arm over the end of the spring leg in question, so that the spring leg can assume its function of fixing the inertia element at the end of the winding movement. In this resumed blocking position of the control clip, the follower impacts with another stop surface against the other spring leg of the control clip, so that the control clip is taken along in its blocking position during the rotation of the control disc and thereby maintains its blocking position.

With regard to the avoidance of the noise caused by the pin of the locking element in the oblong hole of the control disc during the rotation in the belt winding (retraction) direction of the belt shaft carrying the locking element including the control disc coupled to the belt shaft and moving relative to the belt, the invention in principle further provides that during this rotational movement of the belt shaft and control disc, the pin is fixed in the oblong hole by means of the inserted control clip, so that rattle noises cannot appear. In this respect, the arrangement of the oblong hole in the control disc in relation to the mount of the inertia element on the control disc is such that the control clip with its two legs simultaneously fixes the inertia element in the blocking position and fixes the pin guided in the oblong hole.

An embodiment of the invention provides that the stop configured on the leg of the control clip consists of a fixing section bent relative to the control disc in the peripheral direction of the control disc which during the rotation of the control disc in the belt winding direction rests on the end of the pin protruding from the plane of the control disc. This has the advantage that the control clip can be completely configured as a bent wire part or also as a stamped bent part made of an appropriate sheet metal.

An exemplary embodiment of the invention provides that the oblong hole configured in the control disc is enclosed by a peripheral rim protruding over the plane of the control disc and the end of the pin overlapping the plane of the control disc, whose height does not overlap the height of the follower arranged on the control disc; the guiding of the pin of the locking element on the control disc is hereby improved owing to the overlapping pin and the protruding border.

With such a configuration of the control disc, an exemplary embodiment of the invention still provides that the bent section of the clip leg arranged for the fixation of the locking element including the fixing section configured thereon penetrates into the space encompassed by the border enclosing the oblong hole, and the border has a through-hole for the penetration of the free end of the fixing section.

In order to improve the noise damping an advantageous further development of the invention can provide that the control clip is configured in the form of a special component such that the leg interacting with the pin of the locking element is configured by a separate damping part forming a component of the control clip which protrudes into the oblong hole with a cam projecting therefrom to the control disc during the rotation of the control disc in the belt winding direction and thereby fixes the pin in the oblong hole, wherein a slot is additionally configured in the control disc passing into the oblong hole to guide and carry the cam during the relative rotation of the control clip with respect to the control disc. The damping component preferably consists of plastic.

It can further be provided that the damping component additionally forms the central mounting area of the control clip and the other spring arm of the control clip configured as a bent wire part or a stamped bent part is fixed with its bent section encompassing the mounting area of the damper component so as not to rotate on the damper component.

To improve the functioning it can be provided that a hub is configured on the damper component, which projects toward the control disc forming the stop on the stop surfaces of the follower in the belt winding direction.

The belt retractor may also be provided with a vehicle-sensitive control mechanism in addition to a belt-strap-sensitive control mechanism, the vehicle-sensitive control mechanism consisting of a vehicle-sensitive sensor and an external gear arranged on the control disc, it may occur during the functional sequence that when the rotation of the belt shaft with the control disc starts in the belt release direction, the stop formed by the control clip is still locking the movement of the pin in the oblong hole of the control disc, so that during the corresponding rotation of the belt shaft in the belt release direction, the blocking of the belt shaft by the locking element cannot be accomplished. To avoid this additional problem an exemplary embodiment can provide that in order to configure an additional vehicle-sensitive control mechanism the belt retractor has a vehicle-sensitive sensor and the control disc an external gear to interact with the vehicle-sensitive sensor, wherein the external gear of the control disc is arranged so as to rotate on the control disc via a predefined angle of rotation and against the control disc by means of a spring supported and pre-tensioned between the external gear and the control disc. In this case, the torsion angle between the control disc and the external gear can be designed with an angle from 7.5 degrees to 22.5 degrees. In the event of a stoppage of the control disc by the vehicle-sensitive sensor, a relative rotation between the still rotating belt shaft and the stopped control disc occurs, which leads to a release of the pin of the locking element in the oblong hole.

BRIEF DESCRIPTION OF THE DRAWINGS

Exemplary embodiments of the invention are shown in the drawing and are described below. They show.

FURTHER DESCRIPTION OF THE INVENTION

Figure 1:
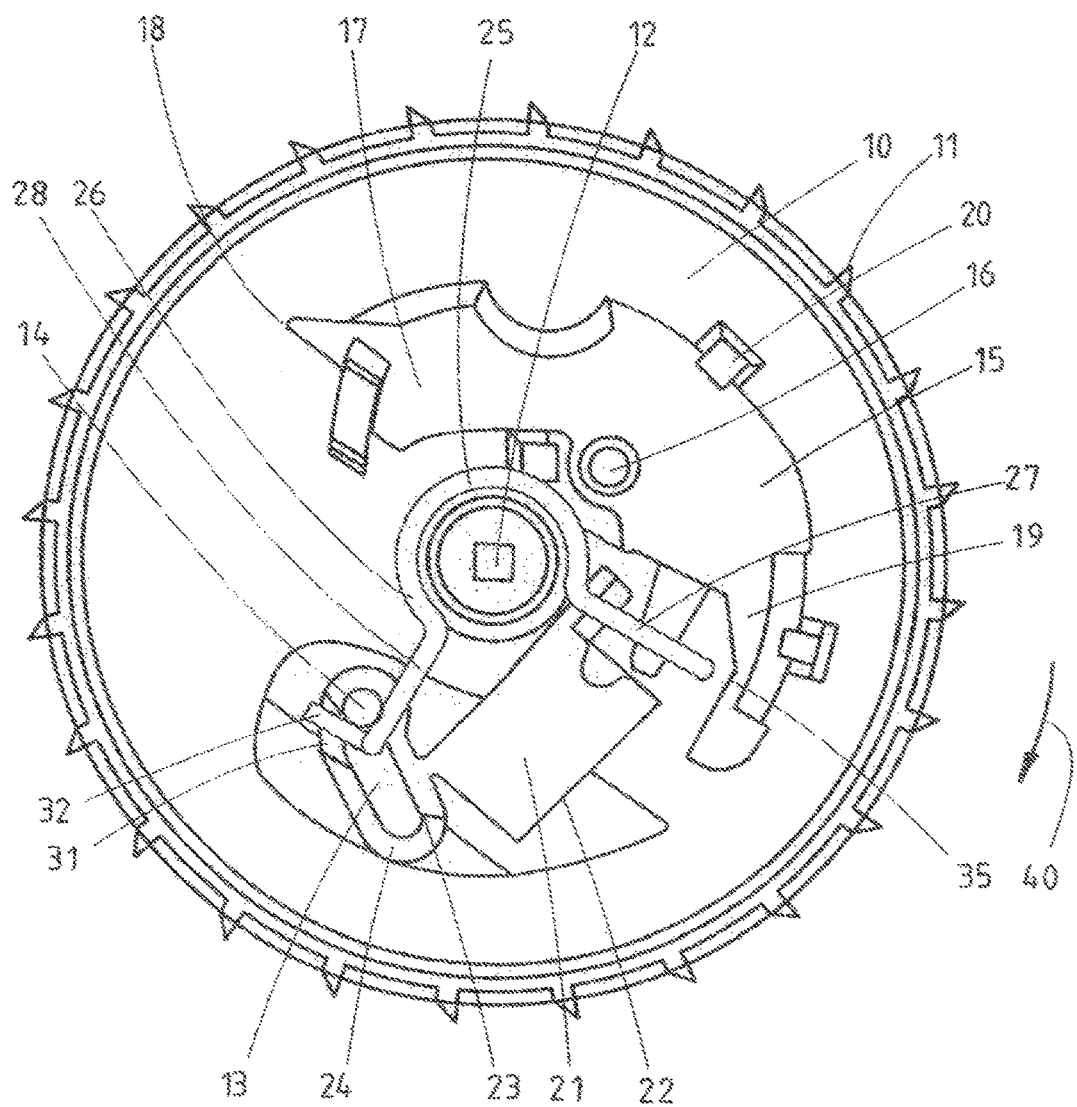
FIG. 1 is a top view of the control disc of a self-locking belt retractor in accordance with this invention with an swivel-mounted inertia element including the allocation of the control clip mounted on a mounting plate, which is not shown, and interacting with the inertia element including the fixation of the locking member on the belt shaft including the control clip in its position relevant to the belt winding direction.

The control disc 10 apparent from FIG. 1 is rotatably mounted on a shaft extension 12 and has an external gear 11 to interact with a vehicle-sensitive control system. An oblong hole 13 is configured in the control disc 10 in which a swivel-mounted pin 14 of the locking element arranged, in the viewing direction, below the control disc 10 on the no longer shown belt shaft is guided. Furthermore, a two-armed inertia element 15 is swivel-mounted on the control disc 10 by means of a rotational mount 16 configured in its central area, wherein the two-armed inertia element has a blocking arm 17 with an external blocking tip 18 and a swivel arm 19. The inertia element 15 is supported on the control disc 10 by retaining arms 20 attached to the control disc 10 and appropriately angled, so that the inertia element 15 is supported on the control disc 10 in particular when rotating together with the control disc 10. As is also not shown, on assembly of the self-locking belt retractor, the pot-shaped recess of the control disc 10 is covered by a mounting plate of the belt retractor resting against it, wherein a corresponding mount for the shaft extension 12 is configured in the mounting plate. Furthermore, the mounting plate has a peripherally projecting blocking rim extending into the pot-shaped recess of the control disc 10 and provided with an internal gear, so that the inertia element 15 that is swivel-mounted on the control disc 10 interlocks in its swiveled-out blocking position, which is not shown in the drawing, with the internal gear of the mounting plate; thus, the control disc 10 is halted in its further rotational movement. In case of a further rotation of the belt shaft a relative rotation of the control disc 10 and of the shaft belt can occur, and thus a displacement of the pin 14 in the oblong hole 13, which in turn results in the locking element swiveling into a blocking gear configured on the belt retractor. The functioning of the self-locking belt retractor is described, for example, in DE 103 24 195 B4 with further reference to DE 29 24 575 A1, or in DE 39 26 370 A1.

A control clip 25 configured Ω-shaped in the form of a bent wire element with a central mounting area 26 provided with a radius is rotatably mounted on the mounting plate, which is not shown, so that the control clip 25 can rotate around the mount on the mounting plate relative to the control disc 10 independently of the rotational movements of the control plate 10. In this connection, the control clip 25 is frictionally mounted on the mounting plate such that, on the one hand, the control clip 25 can rotate together with the control disc 10, on the other hand, a functional phase is possible in which the control clip 25 can stop with respect to the rotation of the control disc 10, and thus perform a relative rotation with respect to the control disc. The Ω-type control clip 25 has two arms 27, 28 spaced apart from each other in the peripheral direction whose function will be described below.

The control clip 25 can perform the rotational movements together with the control disc 10 provided in the functional scheme of the belt retractor, a follower (or actuator) 21 is arranged on the control disc 10 between both clip legs 27 and 28 such that the follower 21 forms the stop surfaces 22 and 23 for both clip legs 27 and 28 of the control clip 25, so that in each direction of rotation of the control disc 10 a stop of the follower 21 interacts with the associated leg of the control clip 25, and thus the control clip 25 is taken along in the respective direction of rotation of the control disc 10. In particular, the follower 21 is configured as a rectangular follower block extending in the peripheral direction of the control disc 10 between the clip arms 27 and 28 of the control clip 25, wherein an external stop surface 22 acts on an external long side of the follower block, while an internal stop surface 23 is formed by the corner of a short side with the long side of the rectangular follower block opposite the stop surface 22. In addition, for reasons of better guiding the pin 14 of the locking element protruding over the plane of the control disc 10, the oblong hole 13 is encompassed by a protruding rim 24 which carries along the pin 13.

In order that the follower 21, the protruding rim 24, as well as the inertia element 15 arranged on the plane of the control disc 10 do not obstruct the provided, and still to be functionally described in detail, relative rotation of the control clip 25 with respect to the control disc 10, the control clip 25 is arranged on the mounting plate such that the control clip 25 with both its legs 27, 28 maintains a separation to the plane of the control disc 10, and thus, during the rotation of the control clip 25 with respect to the control disc 10, the clip legs 27, 28 pass over the follower 21, the protruding rim 24 and the pin 14, wherein the free ends of both legs 27 and 28 have a section 29 bent in the direction of the plane of the control disc 10, and the bent sections 29 of the spring arms 27 and 28 respectively penetrate into the plane of the follower 21 and the inertia element 15 and interact with the components, mentioned above.

Figure 3:
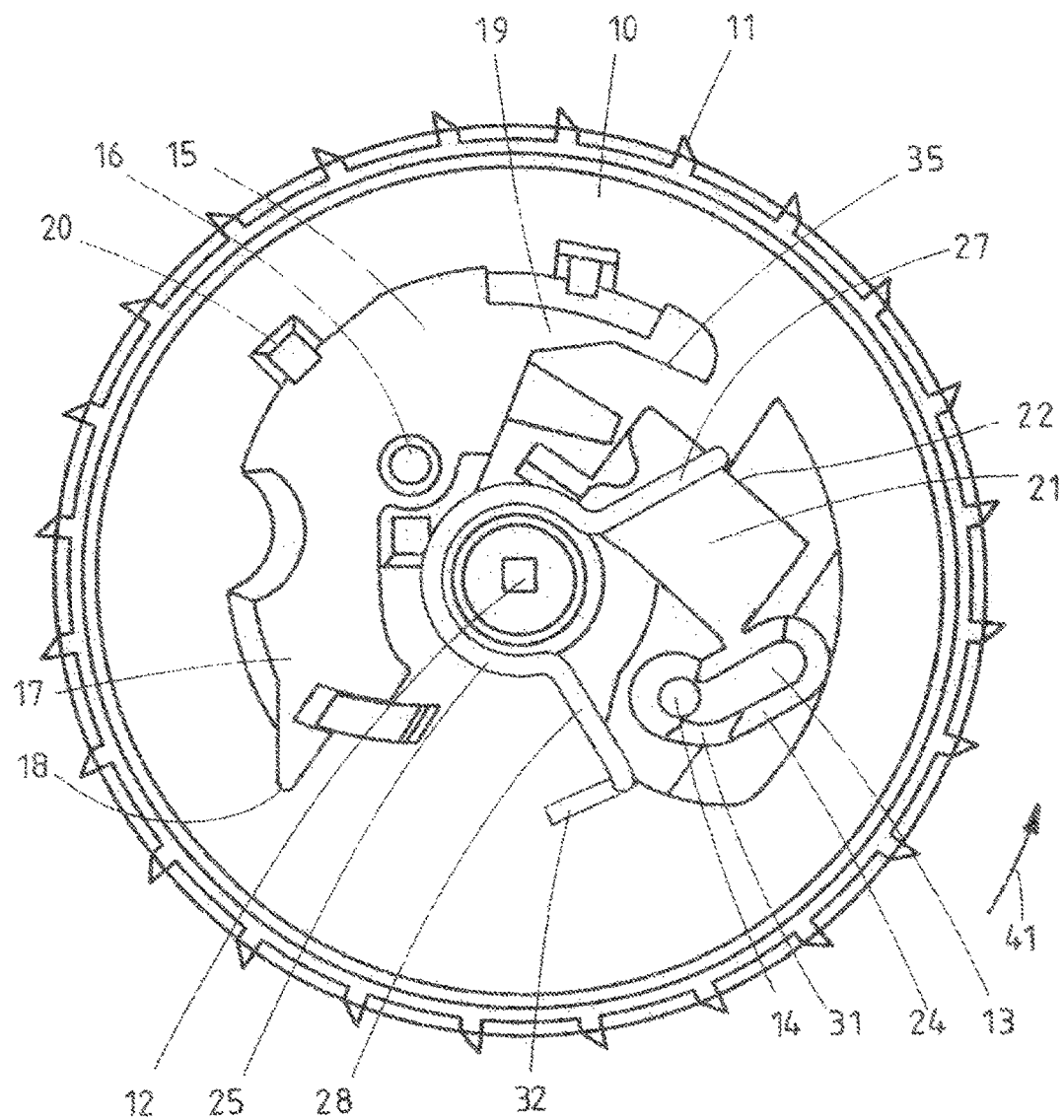
FIG. 3 shows the object of FIG. 1 in the position of the control clip relevant to the belt release direction of the belt shaft.

As is apparent from the comparison of FIGS. 1 and 3, the right leg 27 of the control clip 25 according to FIGS. 1 and 3 is arranged to interact with the swivel arm 19 of the inertia element 15. To that end, on its internal side facing the clip leg 27 or its bent section 29, the swivel arm 19 has a contact surface 35 for the bent section 29 of the clip leg 27, wherein in the position shown in FIG. 1 and the position of the clip leg 27 showing the position of the control clip 25 during rotation of the control disc 10 in the belt winding direction (arrow 40) is positioned against the stop surface 35 of the swivel arm 19 and thus prevents the blocking arm 17 from swiveling outward. The clip leg 27 can extend so far in the direction of the swivel arm 19 of the inertia element 15, which is no longer shown, that the bent section 29 rests against the stop surface 35. In this case, the inertia element 15 is fixed in its rest position during the rotational movements of the control disc 10, so that the inertia element 15 is prevented from rattling. During the corresponding rotational movements of the belt shaft with the control disc 10 in the winding (belt retraction) direction (arrow 40), the control clip 25 remains in the position shown in FIG. 1 because it is taken along by the contact of the internal stop surface 23 of the follower 21 with the bent section 29 including a fixing section of the spring leg 28 of the control clip 25 projecting radially at its end and still to be described. If at the end of the winding movement, it thus comes to a sudden stop of the rotational movement of the belt shaft described as technical background of the prior art according to DE 103 24 125 B4, an inertia-induced deflection of the inertia element 15 in its engaged position with the mounting plate due to the contact of the clip leg 27 of the control clip 25 with the contact surface 35 of the inertia element 15 is excluded.

Now, when the belt is completely put on or while it is being put on, it is partly rotated on the belt shaft of the belt retractor because the belt is extended in the extraction direction (arrow 41) based on the arrangement of the control disc 10 and control clip 25 shown in FIG. 1, wherein during the rotation of the belt shaft in the belt extraction direction, the function of the belt-strap-sensitive control system is ensured and, in so far as the inertia element 15 must be freely swivable, the control clip 25 is slowed with respect to the rotation of the control disc 10 because of its frictionally engaged mounting on the mounting plate, so that a relative rotation of the control disc 10 with respect to the control clip 25 is performed until the contact surface 35 of the swivel arm 19 of the inertia element 15 is released from the clip leg 27 of the control clip 25 and at the end of the rotation path of the control disc 10 relative to the control clip 25 the bent section 29 of the clip leg 27 moves contacting the outer stop surface 22 of the follower block, so that in this spring position now facilitating the swivel movement of the inertia element 15 the control clip 25 is taken along during the further rotational movements of the control disc 10 in the belt release direction (arrow 41). This can be seen in FIG. 3.

If at the end of the belt extension movement there is a switchover of the direction of movement of the belt shaft to the belt winding direction (arrow 40), then there is again a relative rotation of the control disc 10 with respect to the again stopping control clip 25 due to its frictionally engaged mounting, so that the contact surface 35 of the inertia element 15 is again displaced externally over the bent section 29 of the clip leg 27 and the control clip 25 is taken along in this position because of the stop of the internal stop surface 23 of the follower 21 on the leg 28 of the control clip 25.

In order to avoid undesirable rattle noises of the locking element against the control disc 10, a fixation of the pin 14 in the oblong hole 13 by the control clip 25 is also provided. As is apparent from FIGS. 1 to 3, the oblong hole 13 is spatially arranged and oriented on the control disc 10 with the pin 14 of the locking member guided therein such that the leg 28 of the control clip 25 extends over the oblong hole 13. It is in particular provided that the bent section 29 of the clip leg 28 has a fixing section 32 bent in the peripheral direction of the control disc 10 with which the bent section 29 of the clip leg 28 penetrates into the space encompassed by the rim 24 enclosing the oblong hole 13 and fixes the pin 14 located on the internal side of the oblong hole 13 in the winding direction (arrow 40) of the belt shaft in this position and prevents a radial swiveling of the pin 14 in the oblong hole 13. The rim 24 encompassing the oblong hole 13 thus has a through-hole 31 for the passage of the free end of the fixing section 32. It is further understood that because of the penetration of the bent end 29 into the oblong hole 13 with the fixing section 32, the inner stop surface 23 for taking along the control clip 25 is formed in the belt winding direction (arrow 40) by the protruding rim 24, wherein the follower block in this region passes over to the rim 24.

Figure 2:
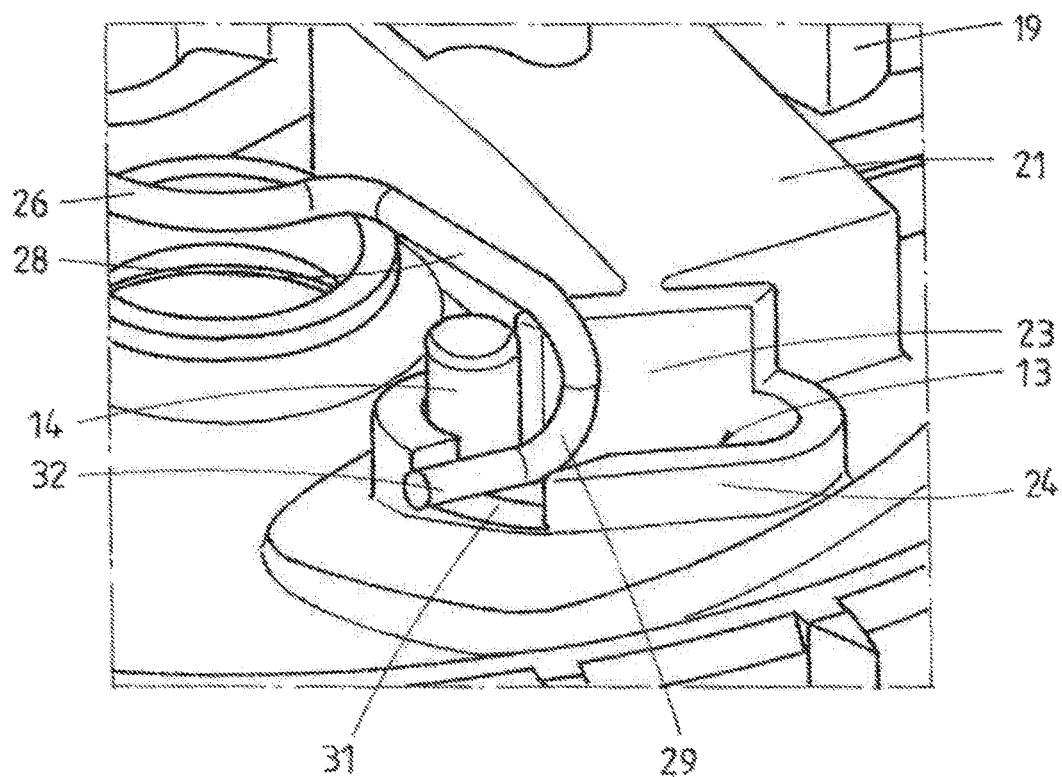
FIG. 2 is an enlarged drawing of the object of FIG. 1 showing the spring leg of the control clip fixing the locking element.

The position of the control clip 25 visible in detail in FIGS. 1 and 2 and the position of its leg 28 with the fixing section 32 used to fix the pin 14 in the oblong hole 13 corresponds to the position of the control clip 25 during the rotation of the control disc 10 in the winding direction (arrow 40). In contrast thereto, FIG. 3 shows the position of the control clip 25 during rotation of the belt shaft in the belt extension direction (arrow 41), wherein the clip arm 28 is swung out of the region of the oblong hole 13 because of the relative rotation of the control disc 10 with respect to the control clip 25, so that during the rotation of the belt shaft in the belt release direction the desired, radially outward displacement of the pin 14 in the oblong hole 13 is facilitated. In this connection, the through-hole 31 provided in the rim 24 frees the path for the movement of the fixing section 32 with the bent section 29 and facilitates the penetration of the clip leg 28 into the oblong hole 13 during a reverse rotation of the control clip 25 to its position (FIGS. 1, 2) relevant to the belt winding direction.

Figure 4:
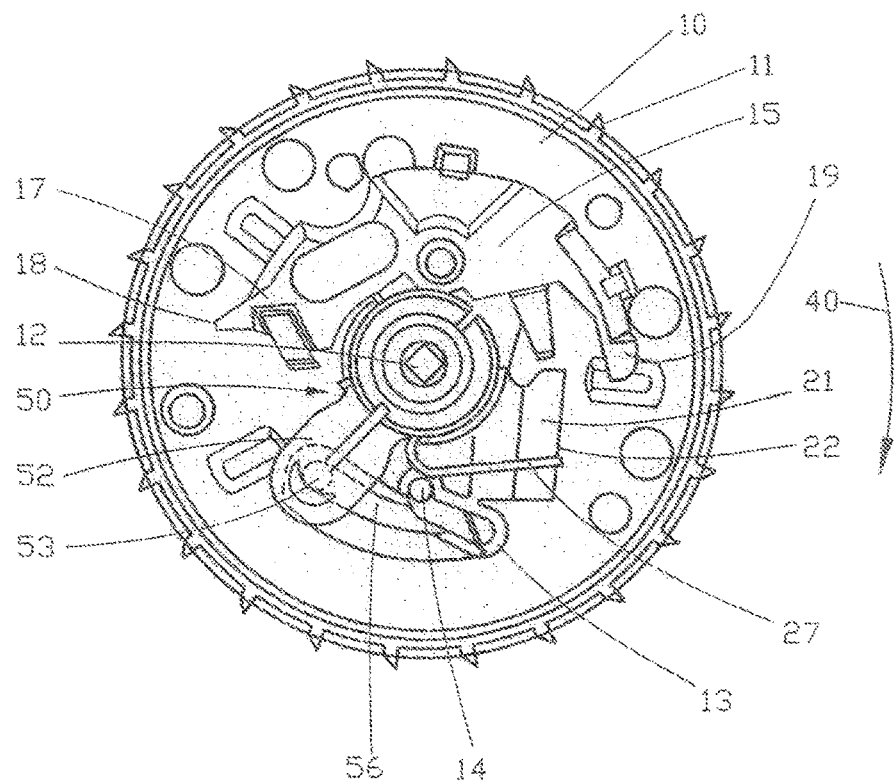
FIG. 4 illustrates another embodiment of the invention with a damping component configured as a component of the control clip in the position of the control clip relevant to the belt release direction of the belt shaft corresponding to FIG. 3.
Figure 5:
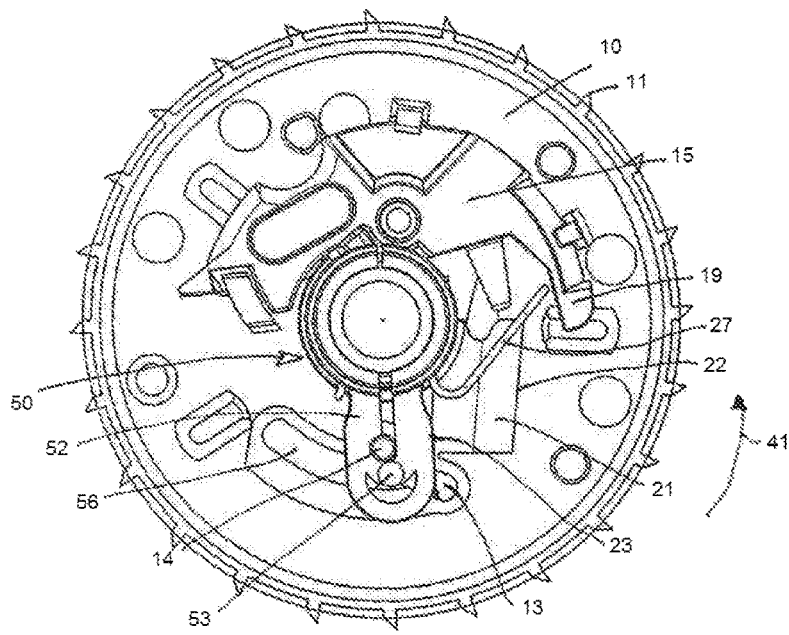
FIG. 5 shows the object of FIG. 4 in the position of the control clip relevant to the belt winding direction of the belt shaft, FIG. 6 provides individual drawings of the parts of the control clip consisting of the damper component and of the arm acting on the inertia element.
Figure 6:
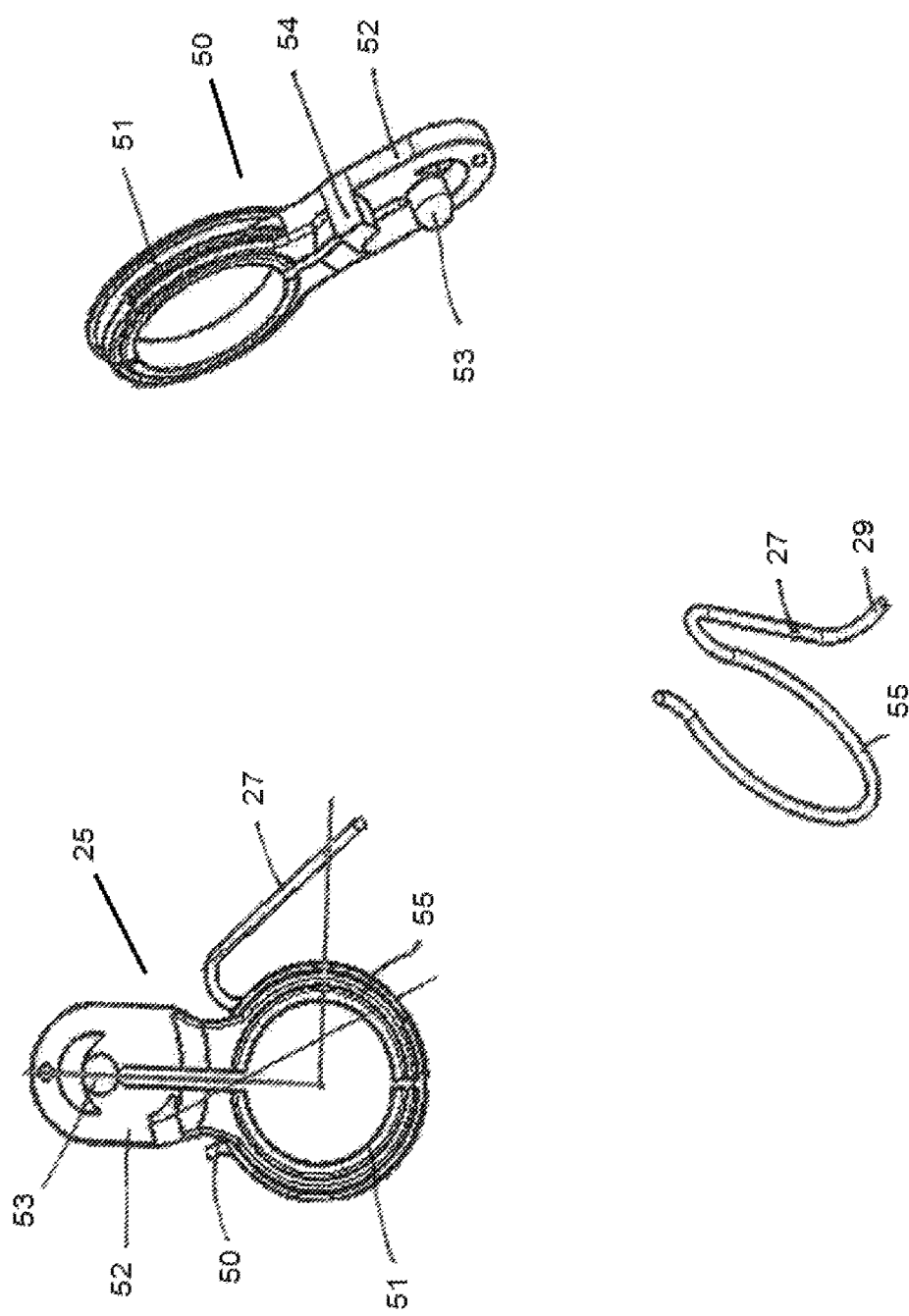

The exemplary embodiment shown in FIGS. 4 to 6 differs from the previously described exemplary embodiment in that the control clip 25 has a special shape. As is apparent from FIG. 6, the control clip 25 consists of a damper component 50 preferably made of plastic which on one end forms a mounting area 51 corresponding to the mounting area 26 in the exemplary embodiment described in FIGS. 1 to 3. An extended arm 52 connects to the mounting area 51 which corresponds to the clip leg 28 in the exemplary embodiment shown in FIGS. 1 to 3. The leg 27, configured as a bent wire part, including a section 55 with a bent shape is placed on the mounting area 51 of the damper component 50 such that the leg 27 assumes a fixed position relative to the arm 52 of the damper component 50. Thus, the Ω-shape of the control clip 25 results from the damper component 50 and the spring leg 27 together. Moreover, a cam 53 projecting therefrom and a projection 54 are configured on the arm 52.

As can be seen from the condition of the belt shaft rotating in the belt winding direction in FIG. 4, the damper component 50 with its mounting section 51 is placed on the mount of the control disc 10 such that the cam 53 projecting from the arm 52 in the direction of the control disc 10 lies in a slot 56 exiting from the oblong hole 13 of the control disc 10 and passing over to it, wherein the leg 27 is at the same time in its release position for the inertia element 15 as is described in FIG. 3. Thus, the belt-strap-sensitive control of the locking element can become effective because the inertia element 15 can swivel out with the appropriate rotational acceleration of the control disc 10 and start the relative rotation between the control disc 10 and the belt shaft, while the oblong hole 13 is at the same time free for the movement of the pin 14 of the locking element, so that the locking element can be radially guided out into its blocking position.

According to FIG. 5, the situation for the belt extraction direction (arrow 41) arises which has already been described in detail for the exemplary embodiment according to FIGS. 1 to 3 in which the leg 27 of the control clip 25 is brought into a blocking position for the inertia element 15 by the relative rotation of the control clip 25 with respect to the control disc 10. At the same time, the cam 53 of the damper component 50 is displaced into the slot 56 by swiveling the damper component 50 up to at least a partial penetration into the oblong hole 13, so that the cam 53 of the damper component 50 immobilizes and fixes the pin 14 of the locking member on the respective end of the oblong hole 13.

Figure 7:
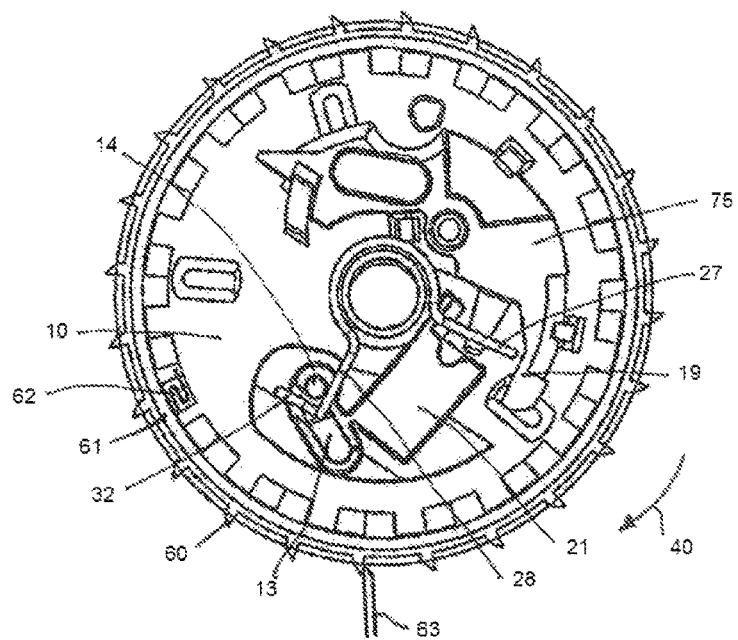
FIG. 7 illustrates another embodiment of the invention with a control disc configured in two parts in a functional position corresponding to FIG. 1 upon the engagement of a vehicle-sensitive sensor on the external gear of the control disc.
Figure 8:
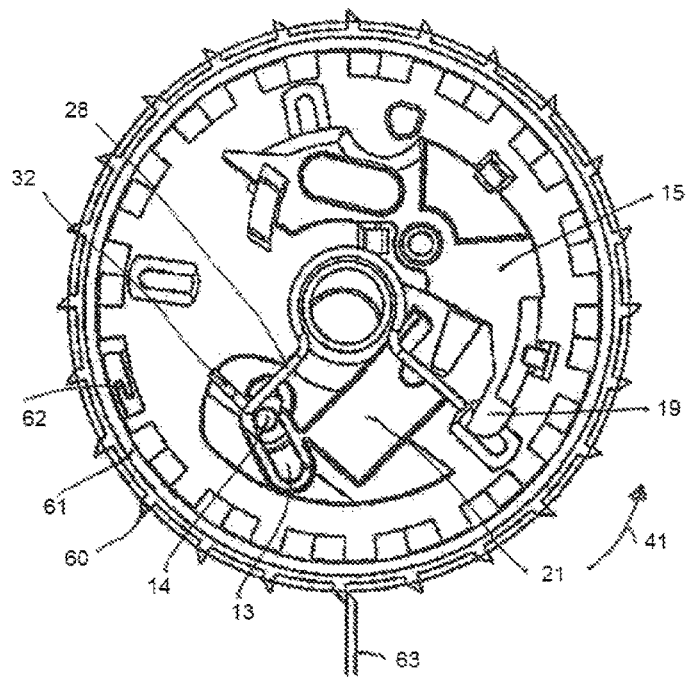
FIG. 8 shows the object of FIG. 7 during further rotation of the control disc in the belt release direction before the deflection of the pin of the locking element in the oblong hole of the control disc.
Figure 9:
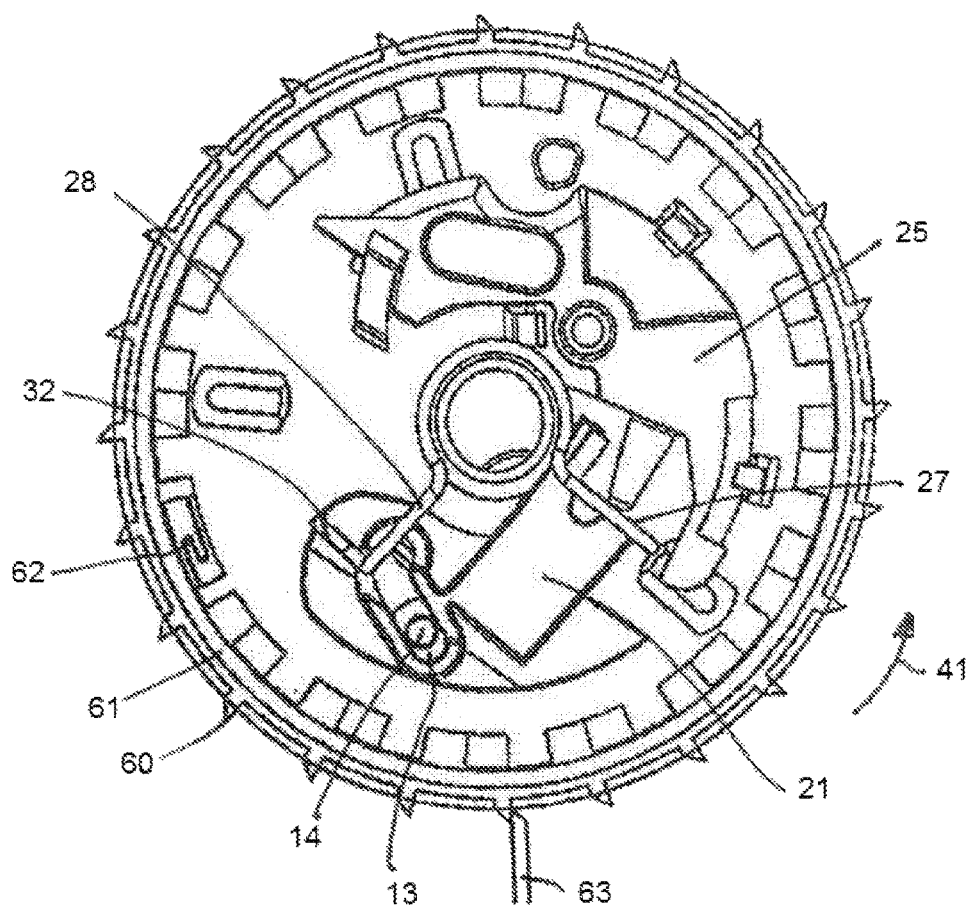
FIG. 9 shows the object of FIG. 8 during further rotation of the control disc in the belt release direction with the pin of the locking element deflected in its blocking position in the oblong hole of the control disc.

Another embodiment of the previously described self-locking belt retractor is shown in FIGS. 7 to 9 with a view on the arrangement of a vehicle-sensitive control mechanism. In so far as the control disc 10 is provided with an external gear 60 which has a vehicle sensor for fixing the control disc 10, and consequently to implement a relative movement between the control disc 10 and the further rotating belt shaft allocated to it, the control disc 10 is configured in two pieces in the exemplary embodiment shown in FIGS. 4 to 6, so that the external gear 60 is a component of a ring 61 arranged on the control disc 10 that can be rotated relative to the control disc 10. A spring 62 is arranged between the control disc 10 and the ring 61 which holds the ring 61 in a predefined position of the control disc 10, but facilitates a relative rotation of the ring 61 with respect to the control disc 10.

In this connection, the situation corresponding to FIG. 1 is shown in FIG. 7 in which the control clip 25 is in the position relevant to the belt winding position where the control clip 25, on the one hand, blocks the movement of the inertia element 15 and, on the other hand, fixes the pin 14 in the oblong hole 13. FIG. 7 now indicates that an external lever 63 of a vehicle sensor contacts the external gear 60 and thus blocks a rotation of the control disc 10.

In the event of a rotation of the belt shaft in the belt release direction (arrow 41) according to FIG. 8, a relative twisting of the control disc 10 coupled to the belt shaft with respect to the ring 61 fixed by the lever 63 of the vehicle sensor occurs, if the blocking procedure is started by the vehicle-sensitive control mechanism with a ring 61 having an external gear 60, the result of which is that by the described twisting of the control clip 25 its arm 28 is swiveled into a position releasing the pin 14 in the oblong hole 13, as shown in FIG. 8. If during the further course of the blocking procedure a relative twisting required for the deflection of the locking element into its blocking position between the belt shaft and the control disc 10 still held stationary after utilizing the spring-induced movement path between the ring 61 and control disc 10 occurs, then the locking element is deflected outward into its blocking position by the releasing movement of the pin 14 in the oblong hole 13 of the control disc 10, as is finally shown in FIG. 9.

While the above description constitutes the preferred embodiment of the present invention, it will be appreciated that the invention is susceptible to modification, variation and change without departing from the proper scope and fair meaning of the accompanying claims.

The invention claimed is:

1. A self-locking belt retractor for seat belts of a type having a belt shaft mounted so as to rotate in a housing frame and tensioned by a winding spring in the winding direction of the belt strap and having at least one belt-sensitive control mechanism which has a control disc coupled to the belt shaft to control a locking element arranged on the belt shaft and deflected during a relative rotation between the belt shaft and the control disc until engaging in the housing frame, and the locking element engages by means of an oblong hole configured in the control disc and is coupled therein during the relative rotation by means of a pin guided between the control disc and the belt shaft, wherein the control disc carries a two-armed inertia element eccentrically swivel-mounted on the control disc via a rotational mount radially offset from a central rotational axis of the control disc, wherein the two-armed inertia element, when triggered, swivels radially against the action of a return spring with a blocking arm until it engages into a stationary toothed section by angular acceleration acting on the control disc, and as a result the control disc stops its rotational movement and is stationary, and comprising a control clip having central area and first and second legs that are spaced apart from each other in the peripheral direction and mounted to the belt shaft by means of a friction mount impeding a movement of the control clip relative to the control disc between a blocked position on the inertia element and a release position on a follower, the control clip protruding from the plane of the control disc, the first and second legs of the control clip having positions arranged in a plane above the inertia element and spaced apart from the plane of the control disc and encompass the follower between them and having sections reaching into the plane of the control disc, wherein the follower forms stop surfaces for the first and second legs to carry the control clip during the rotation of the control disc both in the belt winding direction and in a belt extension direction, such that the control clip releases the inertia element during rotation of the control disc in the belt extension direction and prevents the inertia element from swiveling during rotation of the control disc in the belt winding direction, and wherein furthermore the second leg, used to carry the control clip in the belt winding direction, extends with the section into the movement path of the pin in the oblong hole during the rotation of the control disc in the belt winding direction, and as a result fixes the locking element.

2. The self-locking belt retractor according to claim 1, wherein the section configured on the second leg of the control clip consists of a section bent relative to the control disc in the peripheral direction of the control disc on a fixing section of the second leg, which during the rotation of the control disc in the belt winding direction rests against the end of the pin protruding over the plane of the control disc.

3. The self-locking belt retractor according to claim 2, wherein the follower has a height perpendicular to the plane of the control disc, wherein the oblong hole configured in the control disc is enclosed by a guiding rim projecting from the plane of the control disc and the end of the pin overlapping the plane of the control disc having, perpendicular to the plane of the control disc, a height which does not exceed the height of the follower arranged on the control disc.

4. The self-locking belt retractor according to claim 3, wherein the bent section of the second leg arranged for the fixation of the locking element including the fixing section arranged thereon penetrates into the space encompassed by the guiding rim enclosing the oblong hole, and that the rim has a through-hole for the penetration of the free end of the fixing section.

5. The self-locking belt retractor according to claim 1, wherein the second leg interacting with the pin is formed by a separate damper component forming a component of the control clip which extends into the oblong hole with a cam protruding therefrom toward the control disc during the rotation of the control disc in the belt winding direction and thereby fixes the pin in the oblong hole, wherein a slot is additionally configured in the control disc passing over to the oblong hole to guide and carry the cam during the relative rotation of the control clip with respect to the control disc.

6. The self-locking belt retractor according to claim 5, wherein the damping component additionally forms the central area of the control clip and the first arm of the control clip is configured as a bent wire part or a stamped bent part and is fixed to the mounting area of the damper component.

7. The self-locking belt retractor according to claim 5, further comprising an extension protruding toward the control disc and configured on the damper component which intersects with the stop surface of the follower in the belt winding direction.

8. The self-locking belt retractor according to claim 1, wherein the belt retractor has a vehicle-sensitive sensor and the control disc has an external gear for the interaction with the vehicle-sensitive sensor, wherein the external gear is rotatably arranged on the control disc at a predefined rotation angle and is pre-tensioned in an initial position against the control disc by means of a supporting spring between the external gear and the control disc.

9. The self-locking belt retractor according to claim 8, wherein a torsion angle between the control disc and the external gear is designed to measure from 7.5 degrees to 22.5 degrees.

10. The self-locking belt retractor according to claim 1, wherein the second leg of the control clip interacts with the follower to limit movement of the first leg into engagement with the inertial mass.

11. The self-locking seat by retractor according to claim 1, wherein the control clip is formed as a single piece of wire forming a semicircular bearing area with the first and second legs extending therefrom.

12. The self-locking belt retractor according to claim 1, wherein the follower is an integral part of the control disc.

* * * * *